(12) United States Patent
Blazer et al.

(10) Patent No.: US 12,541,068 B2
(45) Date of Patent: Feb. 3, 2026

(54) SZ STRAND RETENTION OF ASSYMETRICAL OPTICAL FIBER RIBBON UNITS BY A CONFORMING TENSIONED ELASTOMER SHELL

(71) Applicant: CORNING RESEARCH & DEVELOPMENT CORPORATION, Corning, NY (US)

(72) Inventors: Bradley Jerome Blazer, Granite Falls, NC (US); Warren Welborn McAlpine, Hickory, NC (US); David Alan Seddon, Hickory, NC (US); Rebecca Elizabeth Sistare, Hickory, NC (US); Kenneth Darrell Temple, Jr., Newton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 375 days.

(21) Appl. No.: 18/130,968

(22) Filed: Apr. 5, 2023

(65) Prior Publication Data
US 2023/0258895 A1    Aug. 17, 2023

Related U.S. Application Data

(63) Continuation of application No. PCT/US2021/052381, filed on Sep. 28, 2021.
(Continued)

(51) Int. Cl.
*G02B 6/44* (2006.01)
(52) U.S. Cl.
CPC .......... *G02B 6/443* (2013.01); *G02B 6/4436* (2013.01); *G02B 6/44384* (2023.05)

(58) Field of Classification Search
CPC ... G02B 6/443; G02B 6/44384; G02B 6/4436
(Continued)

(56) References Cited

U.S. PATENT DOCUMENTS

| | | | |
|---|---|---|---|
| 4,331,378 A * | 5/1982 | Hartig | G02B 6/4432 385/108 |
| 4,496,214 A | 1/1985 | Oestreich et al. | |

(Continued)

FOREIGN PATENT DOCUMENTS

| | | |
|---|---|---|
| WO | 2015/102817 A1 | 7/2015 |
| WO | 2019/124077 A1 | 6/2019 |

OTHER PUBLICATIONS

Extended European Search Report, EP application No. 21878234.0, dated Oct. 17, 2024, 8 pages, European Patent Office.
(Continued)

*Primary Examiner* — Jerry M Blevins
(74) *Attorney, Agent, or Firm* — Thomas R. Irwin (57) ABSTRACT

An optical fiber cable includes a central element, extending along a longitudinal axis of the optical fiber cable, and a plurality of routable subunits, each routable subunit having a rigidly stranded ribbon stack and a tight buffer layer surrounding the ribbon stack, wherein the subunits are SZ-stranded around the central element to form a cable core. A binder film continuously and contiguously surrounds the plurality of routable subunits along the longitudinal axis and a cable sheath continuously and contiguously surrounds the binder film along the longitudinal axis, wherein the cable sheath has an inside surface and an outside surface, the inside surface defining an elliptical shape and the outside surface defining a generally circular shape.

17 Claims, 4 Drawing Sheets

Related U.S. Application Data (60) Provisional application No. 63/088,677, filed on Oct. 7, 2020.

(58) Field of Classification Search
USPC .......................................................... 385/102
See application file for complete search history.

(56) References Cited

U.S. PATENT DOCUMENTS

| | | | |
|---|---|---|---|
| 5,517,591 | A | 5/1996 | Wagman et al. |
| 6,188,821 | B1* | 2/2001 | McAlpine ............ G02B 6/4484 |
| | | | 385/100 |
| 6,321,013 | B1 | 11/2001 | Hardwick et al. |
| 6,453,098 | B2 | 9/2002 | Elisson et al. |
| 6,546,712 | B2 | 4/2003 | Moss et al. |
| 6,671,441 | B1 | 12/2003 | Bocanegra et al. |
| 6,768,845 | B1 | 7/2004 | Suetsugu et al. |
| 6,895,150 | B2 | 5/2005 | Stingl |
| 7,630,605 | B2 | 12/2009 | Bringuier et al. |
| 8,620,124 | B1 | 12/2013 | Blazer et al. |
| 9,188,754 | B1 | 11/2015 | Risch et al. |
| 9,733,443 | B2 | 8/2017 | Blazer et al. |
| 10,388,434 | B1 | 8/2019 | Gebs |
| 11,340,414 | B2 | 5/2022 | Blazer et al. |
| 2003/0099447 | A1 | 5/2003 | Stingl |
| 2004/0240809 | A1 | 12/2004 | Tedder et al. |
| 2004/0252954 | A1 | 12/2004 | Ginocchio et al. |
| 2005/0018983 | A1 | 1/2005 | Brown et al. |
| 2006/0127016 | A1 | 6/2006 | Baird et al. |
| 2008/0013899 | A1 | 1/2008 | Gowan et al. |
| 2009/0274425 | A1 | 11/2009 | Caldwell et al. |
| 2014/0086543 | A1 | 3/2014 | Blazer et al. |
| 2015/0355430 | A1 | 12/2015 | Clampitt et al. |
| 2016/0306129 | A1 | 10/2016 | Hurley et al. |
| 2017/0131496 | A1* | 5/2017 | Blazer ................... B29C 48/154 |
| 2017/0219791 | A1 | 8/2017 | Sinkfield et al. |
| 2017/0293097 | A1 | 10/2017 | Ito et al. |
| 2018/0180831 | A1 | 6/2018 | Blazer et al. |
| 2019/0121043 | A1 | 4/2019 | Baucom et al. |
| 2020/0142144 | A1* | 5/2020 | Blazer .................. G02B 6/4432 |
| 2020/0310058 | A1 | 10/2020 | Blazer et al. |

OTHER PUBLICATIONS

International Search Report and Written Opinion of the International Searching Authority; PCT/US21/52381; dated Dec. 27, 2021; 8 pages; Commissioner for Patents.

* cited by examiner

SZ STRAND RETENTION OF ASSYMETRICAL OPTICAL FIBER RIBBON UNITS BY A CONFORMING TENSIONED ELASTOMER SHELL

CROSS-REFERENCE TO RELATED APPLICATIONS

This application is a continuation of International Application No. PCT/US2021/052381 filed Sep. 28, 2021, which claims the benefit of priority of U.S. Provisional Application Ser. No. 63/088,677 filed on Oct. 7, 2020, the content of which is relied upon and incorporated herein by reference in its entirety.

BACKGROUND

High density optical fiber cables manufactured with planar ribbons are traditionally delivered to the market with a central tube cross section consisting of a unidirectionally rigidly stranded ribbon stack or with a cross section of SZ planetary stranded loose buffer tubes that contain unidirectionally stranded planar ribbon stacks within each tube. Planar ribbons have an asymmetrical area moment of inertia ranging from 1330:1 for a 12-fiber ribbon to 42,900:1 for a 36-fiber ribbon. Therefore, when a cable that contains planar ribbons organized in a parallel stack is bent to typical installation bend radii, the ribbon stack requires "free space" to accommodate the out of plane undulating shape that the ribbon stack develops in order to permit the ribbons and the fibers within them to achieve their lowest energy state which minimizes strain within each optical fiber and minimizes increases in attenuation. The required free space may be defined as clearance within a buffer tube which is typically 60% for planar ribbon configurations.

More recently, high density optical fiber cable constructions have been developed that use polarly/transversely flexible ribbons which permits higher fiber densities within a buffer tube. These highly flexible ribbons reduce the area moment of inertia ratio to less than 10:1. This feature coupled with the reduction in material consumption of a planar ribbon permits a reduction in buffer tube area of approximately 50% for a 144 fiber tube, which can equate to a buffer tube inner diameter reduction from 6.2 millimeters (mm) to 4.2 millimeters (mm). Loose buffer tubes typically have sufficient stiffness to provide isolation from point loading induced by yarn binders that are typically used to couple the buffer tubes to the central element during SZ stranding. Therefore, the combination of transversely flexible ribbons and smaller buffer tubes permits these designs to use traditional SZ stranding techniques while still meeting higher fiber density requirements. There are additional product offerings that use highly flexible ribbons in a central tube. However, these constructions are not SZ stranded and are not segregated into 144-fiber routable subunits preferred by the craft.

This disclosure relates generally to an optical fiber ribbon cable and more particularly to an optical fiber cable having a high fiber density contained within a small diameter jacket through the use of buffered ribbon stacks SZ-stranded around a central element and held in place by a binder film. The optical fiber ribbon cable provides up to at least 864 fibers dimensioned to fit within a one-inch duct.

SUMMARY

In accordance with aspects of the present disclosure, an optical fiber cable includes a central element, extending along a longitudinal axis of the optical fiber cable, and a plurality of routable subunits, each routable subunit comprising a rigidly stranded ribbon stack and a tight buffer layer surrounding the ribbon stack, wherein the subunits are SZ-stranded around the central element to form a cable core. A binder film continuously and contiguously surrounds the plurality of routable subunits along the longitudinal axis and a cable sheath continuously and contiguously surrounds the binder film along the longitudinal axis, wherein the cable sheath comprises an inside surface and an outside surface, the inside surface defining an elliptical shape and the outside surface defining a generally circular shape. A plurality of strength elements may be embedded in the cable sheath and arranged in diametrically opposed pairs, which creates a preferred bend axis.

In another aspect, the present disclosure relates to a method of preparing an optical fiber cable. In the method, a plurality of tight-buffered ribbon stacks are SZ-stranded around a central element extending along a longitudinal axis of the optical fiber cable. A binder film is extruded around the plurality of tight-buffered ribbon stacks and a sheath is applied to surround the binder film.

In still another aspect, the present disclosure relates to an optical fiber cable. The optical fiber cable includes a central element extending along a longitudinal axis of the optical fiber cable. The optical fiber cable also includes a first plurality of tight-buffered ribbon stacks forming subunits that are SZ-stranded around the central element. The free space within each subunit is reduced and minimal core strain is maintained by providing free space outside of the subunits. Each of the tight-buffered ribbon stacks comprises a plurality of optical fiber ribbons surrounded by a buffer layer, and each of the plurality of tight-buffered ribbon stacks has a rectangular cross-section. A binder film continuously and contiguously surrounds the plurality of subunits along the longitudinal axis. Further, the optical fiber cable includes a cable sheath that continuously and contiguously surrounds the binder film along the longitudinal axis. The cable sheath has an inner surface and an outer surface defining an outermost surface of the optical fiber cable. The inner surface defines an ovular shape and the outer surface defines a circular shape. In the optical fiber cable, the first plurality of tight-buffered ribbon stacks includes at least 864 optical fibers and wherein the outer surface defines an outer diameter of no more than 23 mm.

Additional features and advantages will be set forth in the detailed description that follows, and in part will be readily apparent to those skilled in the art from the description or recognized by practicing the embodiments as described in the written description and claims hereof, as well as the appended drawing.

It is to be understood that both the foregoing general description and the following detailed description are merely exemplary and are intended to provide an overview or framework to understand the nature and character of the claims.

BRIEF DESCRIPTION OF THE DRAWING

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Various embodiments of an optical fiber cable containing a plurality of buffered ribbon stacks SZ-stranded around a foam central element and secured with a binder film are provided. The cable as described is able to provide a high fiber density (e.g., at least 864 optical fibers) while also maintaining a small diameter (e.g., such that the optical fiber cable can be pulled through a 1″ duct). As will be discussed in detail below, the binder film is elastic so that the buffered ribbon stacks are able to shift easily when external forces impinge upon the cable. Also disclosed herein are various methods to manufacture an optical fiber cable having a binder film extruded over SZ-stranded-buffered ribbon stacks. These and other aspects and advantages will be discussed in relation to the embodiments provided herein. The embodiments of the optical fiber cable disclosed herein are provided by way of example and not by way of limitation.

Figure 1:
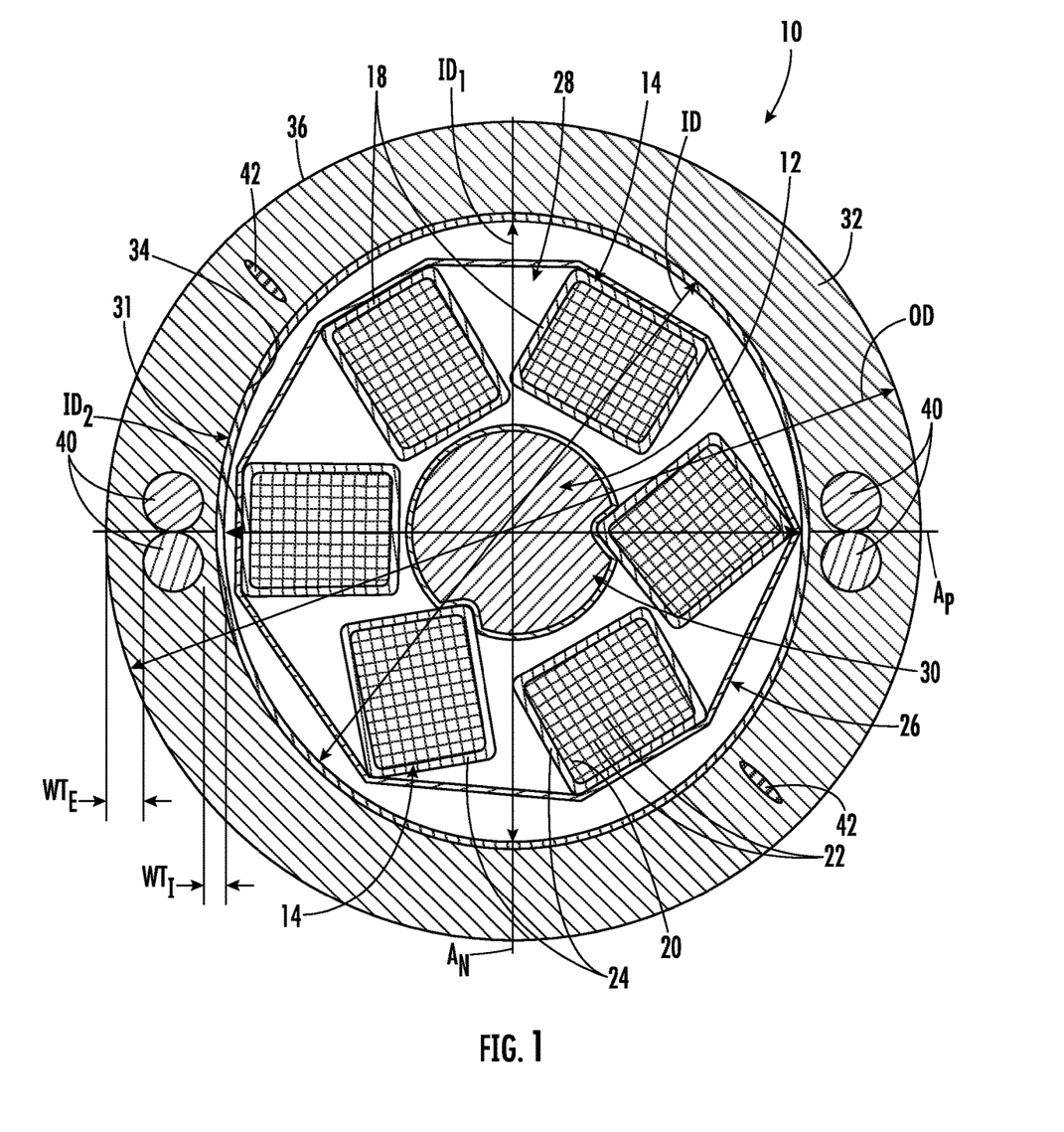
FIG. 1 depicts an optical fiber cable having SZ-stranded tight-buffered rigidly stranded ribbon stacks bound with a binder film, according to aspects of the present disclosure.

FIG. 1 depicts an embodiment of an optical fiber cable 10 according to the present disclosure. The optical fiber cable 10 includes a central element 12 extending along a longitudinal axis of the optical fiber cable 10. In the embodiment depicted, the central element 12 is a cylindrical element that extends longitudinally and is comprised of a low density polyethylene (LDPE) foam material. The optical fiber cable 10 has a plurality of routable subunits 14 stranded around the central element 12. Each subunit 14 comprises a ribbon stack 18 that includes a plurality of optical fiber ribbons 20. Each optical fiber ribbon 20 has a plurality of optical fibers 22 arranged in a planar row. As can be seen in FIG. 1, each ribbon stack 18 is surrounded by a continuous, tight buffer layer 24 that may be in contact with the top, bottom, and sides of the stack of optical fiber ribbons 20. The buffered ribbon stacks 18 of subunits 14 are in contrast to other cable designs that utilize a loose-tube configuration in which the stacks of optical fiber ribbons are surrounded by a substantial amount of free space within a generally round buffer tube (e.g., 60% of the cross-sectional area being free space). Thus, as used herein, a "buffered ribbon stack" refers to a stack of optical fiber ribbons surrounded by a buffer layer with there being 10% or less of free space surrounding the stack of optical fibers in a cross-sectional area within the buffer layer 24.

The tightly buffered planar ribbon stacks 18 retain an asymmetrical bend axis, i.e. a preferred bend axis. Removing the free space from within the buffer layer 24, as compared to that that exists in a loose tube, dictates that the clearance necessary for achievement of a lower energy state by the fibers 22 within the planar ribbon stack 18 must be accomplished outside of the tight buffered subunit 14. This precludes the traditional use of polyester or aramid yarn binders, for example, which apply concentrated forces and would tightly constrain the subunits polarly, radially and axially to the central element in order to retain the reverse oscillation lay inherent in SZ stranding.

In embodiments, the optical fiber cable 10 includes from three to twelve routable subunits 14. In embodiments, each tight-buffered ribbon stack 18 includes from four to sixteen optical fiber ribbons 20, and in embodiments, each optical fiber ribbon 20 includes from four to thirty six optical fibers 22. In the embodiment depicted, the optical fiber cable 10 includes six routable subunits 14 with each having a ribbon stack 18 of twelve optical fiber ribbons 20, and each optical fiber ribbon 20 having twelve optical fibers 22. Thus, the optical fiber cable 10 includes 12×12×6 optical fibers 22 (or 864 optical fibers 22). Each routable subunit 14 includes 144 optical fibers 22. In embodiments, the individual optical fibers 22, the optical fiber ribbons 20, and the buffer layer 24 of each subunit 14 may be color-coded using telecommunication standard colors, for example, for identification purposes. In accordance with other aspects of the present disclosure, water-swellable materials, such as superabsorbent polymer or water-swellable yarns, may be included in each subunit 14 to assist with preventing water penetration.

The routable subunits 14 are stranded together to form a cable core 28. Cable 10 uses SZ stranding which is a planetary stranding method that reverses stranding direction periodically from the left hand or "S" direction to the right hand or "Z" direction. SZ stranding removes the helical constraint that holds unidirectionally stranded cores together. However, this type of construction requires a mechanism to retain the stranding within the core, such as an applied binder to retain the construction. Otherwise, the act of reversing direction will result in an unorganized core. Alternating stranding direction permits the components of the core to be unwound between the ends of cable, permitting mid-span and/or taut-line access to the optical fibers with the cable core.

Figure 2:
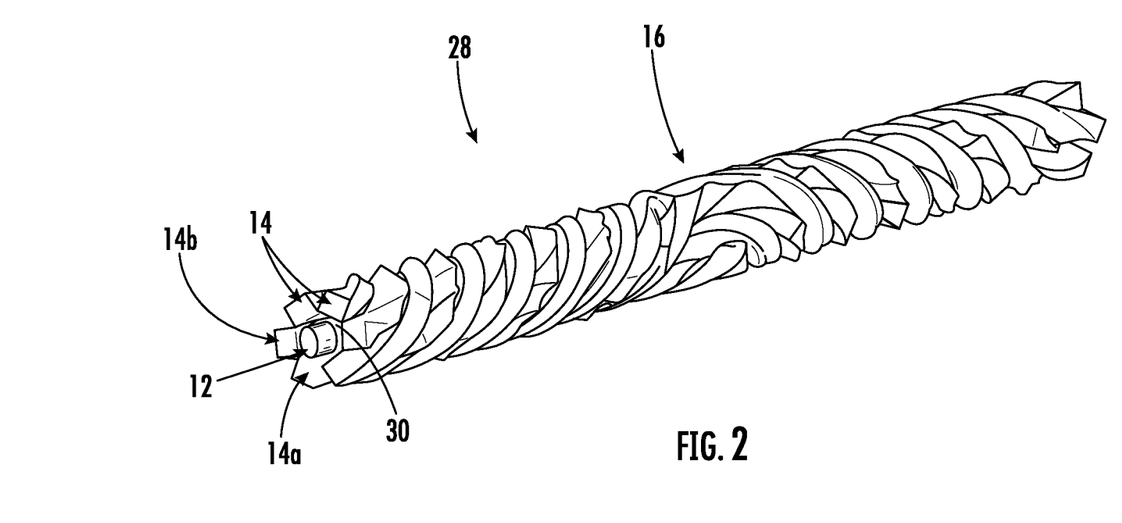
FIG. 2 depicts a perspective view of the stranded core of the optical fiber cable of FIG. 1, according to aspects of the present disclosure.

FIG. 2 depicts a perspective view of a section of cable 10 with the routable subunits 14 SZ-stranded around the central element 12. As can be seen, the stranding of the subunits 14 changes from S to Z at a reversal point 16. In general, stranding is done to facilitate strain balancing when the cable 10 is bent. Stranding of the subunits 14 rotates the subunits 14 about a centerline in a helical pattern so that when the cable 10 is bent, the subunits 14 are alternately placed in bending and tension. Optimally practiced, tension within a subunit 14 will pull from the portion of that subunit 14 which is in compression which reduces both the peak tensile and the compressive stresses within the subunit 14. It is important to minimize stresses within the subunits 14. Stress within the subunits 14 are transferred to the optical fibers 22. If these stresses are realized as bending, the optical fiber attenuation can increase to unacceptable levels. If the stresses are realized as high strain values, the optical fiber 22 may actually mechanically fail.

In order for stranding to reduce stress, the subunits 14 must be permitted to slide relative to each other and slide relative to the central element 12 about which they are stranded. Alternatively, the central element 12 and a binder film 26 that has been used to facilitate core construction can elongate to permit this movement. In embodiments, the subunits 14 are planetarily stranded. Planetary stranding bends the subunits 14 around the central element 12 but does not twist them. Twisting the subunits 14 would render the relative helix lengths from ribbon to ribbon to be incorrect.

If additional twisting of the subunits 14 were induced, the additional helix length required of each ribbon 20 would be realized as strain within the optical fibers 22 of the ribbon 20. If the twisting were to unwind the subunits 14, the additional ribbon length would be realized as buckling within the optical fibers 22 of the ribbon 20. If the tensile stiffness of these two components is sufficiently low, the movement of the subunits 14 along the helical path can be accomplished at very low stress levels.

The subunits 14 are SZ-stranded around the central element 12. However, the ribbon stacks 18 are also themselves each unidirectionally rigidly stranded and surrounded with the buffer layer 24 prior to SZ stranding of the subunits 14. The buffer layer 24 of the subunit 14 is tight but not so tight as to severely restrict relative movement of the ribbons 20 in the ribbon stack 18. Otherwise, the subunit 14 becomes extremely stiff and inflexible. Every other subunit 14 has the opposing rigid strand direction of the previous or adjacent subunit 14 for the purpose of torsionally balancing the core 28. For example, as shown in FIG. 2, subunit 14a has a left hand lay followed by subunit 14b which has right hand lay. The resulting construction is a uniformly reversing SZ core with a Reverse Oscillation Lay (ROL) every 720°.

To form the core 28, an SZ stranding lay-plate is extended through an extrusion crosshead. This lay-plate, also referred to as a nose piece due to its length, guides the subunits 14 and oscillates them to introduce a helix into them as they are formed around the central element 12. The LDPE foam central element 12 may be provided with a water blocking material, shown as a water blocking tape 30 surrounding the central element 12 along the longitudinal axis in FIGS. 1 and 2, to block the migration of ground water along the interior interstitial spaces.

As shown in FIGS. 1 and 2, the rigidly pre-stranded subunits 14 may be substantially rectangular in cross section as opposed to a typical circular shape, and thus the surface that presents itself to the central element during the planetary action of stranding changes as the subunit 14 forms a helix. The diagonal of the rectangular subunit 14 is its largest dimension. The variation in orientation of the subunit 14 coupled with the asymmetry in bending stiffness results in a nonuniform helical bending radius formed by each subunit 14. In addition, the bending stiffness of each of the subunits 14 is not synchronized, which leads to a core 28 with significant undulating dimensions. To accommodate the changes in radius and resulting irregular core shape, a molten extruded binder film 26 is concurrently applied over the subunits 14 as they are being planetarily SZ stranded. SAP (super-absorbent polymer) powder may be injected underneath the binder film 26 to provide ground water blocking for the outer interstial spaces formed by the film and the stranded units. In embodiments, the binder film 26 is formed from an elastic material, such as impact-modified polypropylene copolymer, among others. In other embodiments, the binder film 26 is formed from at least one of linear low-density polyethylene (LLDPE), a polyester, a polyamide, or a polypropylene copolymer. In embodiments, the binder film 26 comprises an LLDPE material having a thickness of from 0.02 mm to 0.15 mm, preferably about 0.12 mm, and forms a continuous tensioned shell in all directions that applies a distributed radial force to the subunits 14 as the LLDPE material cools below its vicat softening temperature. At the conclusion of this process, the subunits 14 are constrained in an SZ stranding configuration in the radial, polar and axial directions by the binder film 26. This results in a binder film 26 that is a uniquely conformed elastic sleeve as required by each stranded core cross-section.

Stranding an element of any type induces a bend radius in the element that is being stranded. If the element being stranded has a homogenous bending stiffness, it will follow this radius uniformly. However, if the element being stranded has a nonuniform bending stiffness, it will only average to the desired bending radius. The subunits 14 of cable 10 have a nonuniform bending axis. The advantage of using the thin binder film 26 is that the thin binder film 26 is applied to the shape of core and conforms to that shape while in its molten form rather than distorting the core as a concentrated yarn binder does. Upon cooling, the binder film 26 applies a uniform radial load along the curved surface of the stranded subunits. This is accomplished by thermal shrinkage of the binder film 26 and is a function of the thickness of the binder film 26 and its coefficient of thermal expansion.

Disposed around the binder film 26 and core 28 is a cable sheath 32. The cable sheath 32 has an interior surface 34 and an exterior surface 36. In embodiments, the exterior surface 36 defines the outermost surface of the optical fiber cable 10. In embodiments, the cable sheath 32 is formed from, e.g., medium density polyethylene (MDPE), or another jacketing material. In embodiments, the cable sheath 32 may include one or more strength elements 40. For example, in the embodiment shown in FIG. 1, the cable 10 includes four strength elements 40 arranged in diametrically opposed pairs, which creates a preferred bend axis $A_P$. The two strength elements 40 of the first pair are embedded in the cable sheath 32 tangent to each other on one side of the cable sheath 32 and the other two strength elements 40 of the second pair are embedded in the cable sheath 32 tangent to each other and oriented 180° on the opposite side of the cable sheath 32. In embodiments, the strength elements are, e.g., glass reinforced plastic (GRP) rods or steel wires. In embodiments, the strength elements 40 have a diameter of from 1 mm to 2 mm, more particularly about 1.6 mm. In embodiments, the cable sheath 32 has a thickness Ts between the inner surface 34 and the outer surface 36 that is, on average, from 2 mm to 3 mm.

As shown in FIG. 1, a core barrier layer 31 may be provided to surround the core 28 between the binder film 26 and the cable sheath 32. The core barrier layer 31 may be, for example, a water swellable tape constructed with a polyester carrier. In addition to blocking the migration of ground water between the binder film 26 and the cable sheath 32, the core barrier layer 31 acts as a thermal and physical barrier between the MDPE sheath 32 and the thin LLDPE binder film 26. Since these two materials are in the same polyolefin family and the heat capacity of the cable sheath 32 is substantial, they would otherwise bond together during extrusion of the cable sheath 32.

During the application of the cable sheath 32, the strength elements 40 may be tensioned to a strain level of 0.18% while the stranded core 28 is tensioned to a core strain level of 0.1%. The relative strain differences between the strength elements 40 and the core 28, coupled with the contraction forces of the MDPE sheath 32, results in an excess core length (ECL) of 0.2%. The additional contraction of the sheath 32 is achieved from the contraction forces of the MDPE.

In a particular, commercially envisioned embodiment, the optical fiber cable 10 has six buffered ribbon stacks 18 forming routable subunits 14, each ribbon stack 18 having twelve optical fiber ribbons 20 with twelve optical fibers 22 each for 864 total optical fibers 22. For this cable the nominal or average inside diameter (ID) has been determined to be 16.7 mm. However, the actual shape of the interior surface 34 defines an ellipse, wherein a first inside diameter $ID_1$ is approximately 16.2 mm when measured across the preferred bending axis $A_P$ and a second inside diameter $ID_2$ is approximately 17.2 mm when measured across the nonpreferred bending axis $A_N$. This cross-sectional area of 219.4 mm$^2$ permits an ECL of 0.2% while allowing a sufficient contraction window at −40° C. at compression stiffness of 418 kN.

The orientation of the strength elements 40 forms the preferred bending axis $A_P$. The cable prefers to bend about axis $A_P$ that is oriented between the two pairs of strength elements 40. The strength elements 40 are embedded between the interior surface 34 and the exterior surface 36 of the cable sheath 32. An interior wall thickness $WT_1$ of the sheath at the location of the strength elements 40 is approximately 0.4 mm between the strength elements 40 and the interior surface 34 and an exterior wall thickness $WT_E$ is approximately 1.0 mm thick between the strength elements 40 and the exterior surface 36 of the cable sheath 32. The interior thickness $WT_1$ permits the cable construction to tolerate installation twists at a rate of one full twist per 500 mm of cable length. The exterior wall thickness $WT_E$ prevents buckling failures of the composite sheath 32 when bent to a coil diameter equal to 20× the outside diameter of the cable 10. Combining the thickness of the strength members 40, the interior thickness $WT_1$, and the exterior thickness $WT_E$ provides for an overall thickness of the cable sheath 32 on each side along the preferred bending axis $A_P$ of approximately 3.0 mm, which combined with the ID of approximately 16.2 mm along the preferred bending axis $A_P$ equals an outside diameter (OD) of the cable 10 of approximately 22.2 mm when measured along the preferred bending axis $A_P$. The OD of the cable 10 is substantially uniform and circular because the wall thickness of the cable sheath along the non-preferred bending axis $A_N$ is approximately 2.5 mm on each side. Combined with the ID of approximately 17.2 mm along the non-preferred bending axis $A_N$, the OD of the cable 10 along the non-preferred bending axis $A_N$ is also approximately 22.2 mm. The unique elliptical interior and circular exterior of this cable construction provides free space for the core to acquire asymmetrical bends as it conforms to the minimum bending diameter of the cable construction while achieving a wall thickness greater than 10% of the cable diameter. This wall thickness ratio ensures that the cable will not kink when bent to specified bending diameters.

The interior clearance or free space around the stranded core 28 enables additional bending of the core 28 that is required with the addition of ECL (Excess Core Length), the bending that is required to place a cable on a reel for shipping, that is required for smaller bend radii required during installation and bend radii required for the longer term installed condition. The tighter the bends in the core, the greater the range in bend radii required by the ribbon units themselves. The relatively low stiffness of the binder film 26 in all directions, the distributed coupling forces applied by the binder film 26, the low bending stiffness of the central element 12, the compressibility of the central element 12, and the clearance between the core 28 and the sheath 32 permit the subunits 14 to move more freely without attenuation inducing bends in the optical fibers 22 that are encapsulated within the planar ribbons 20. By moving the clearance that was formerly within buffer tubes outside of the buffer tubes and incorporating short distances between ROL (Reverse Oscillation Lay or reversal points) of the SZ strand, less total free space within the cable is required in order to achieve strain relief for the planar ribbon stacks subjected to installation bends. Therefore, the overall cable diameter can be smaller.

The relative sheath wall thickness at each location of the sheath is controlled by the geometry of the extrusion tooling. The extrusion tooling also inserts fast access material and controls location of the fast access features 42 shown in FIG. 1. Fast access features 42 are discontinuities co-extruded into the cable sheath 32 in order to promote ease of access to the core 28 of the cable 10. The fast access features 42 comprise a material that shears under a pulling load as opposed to bond failure at the bond between the fast access feature 42 and the cable sheath 32. The fast access features 42 enable the field craft to more quickly access the routable subunits 14 and/or the optical fibers 22 while reducing cable cost through the elimination of ripcords.

The sheath extrusion is a tubing extrusion combined with pressure extrusion around the strength elements 40. Therefore, the shape of the cable sheath 32 is not influenced by the shape of the core within. The circular geometric shape of the cable sheath 32 is retained during extrusion of the sheath 32 by the introduction of compressed air through the extrusion tip that pressures the interior. The pressure within the sheath 32 is controlled by the flow rate of air into the interior and developing a positive pressure by controlling the pressure drop of its exhaust. The pressure drop is a function of the length and diameter of the guide tube between the water swell tape forming die and the extrusion tip within the extrusion crosshead. This process leverages the pressure of a confined fluid within a vessel. The pressure acts perpendicular and equally to all surfaces that form the pressure vessel, i.e. the sheath. The positive pressure within the sheath 32 resists the contraction forces within the sheath 32 as it is drawn and cools during the extrusion process. While the pressure does act uniformly against the interior of the sheath composite, asymmetry in the wall strength of the composite results in an asymmetric or noncircular response to the pressure. To achieve circularity, the sheath 32 passes through a series of circular rings submerged in a cooling bath that calibrate its exterior shape to one that approaches circular.

Figure 3:
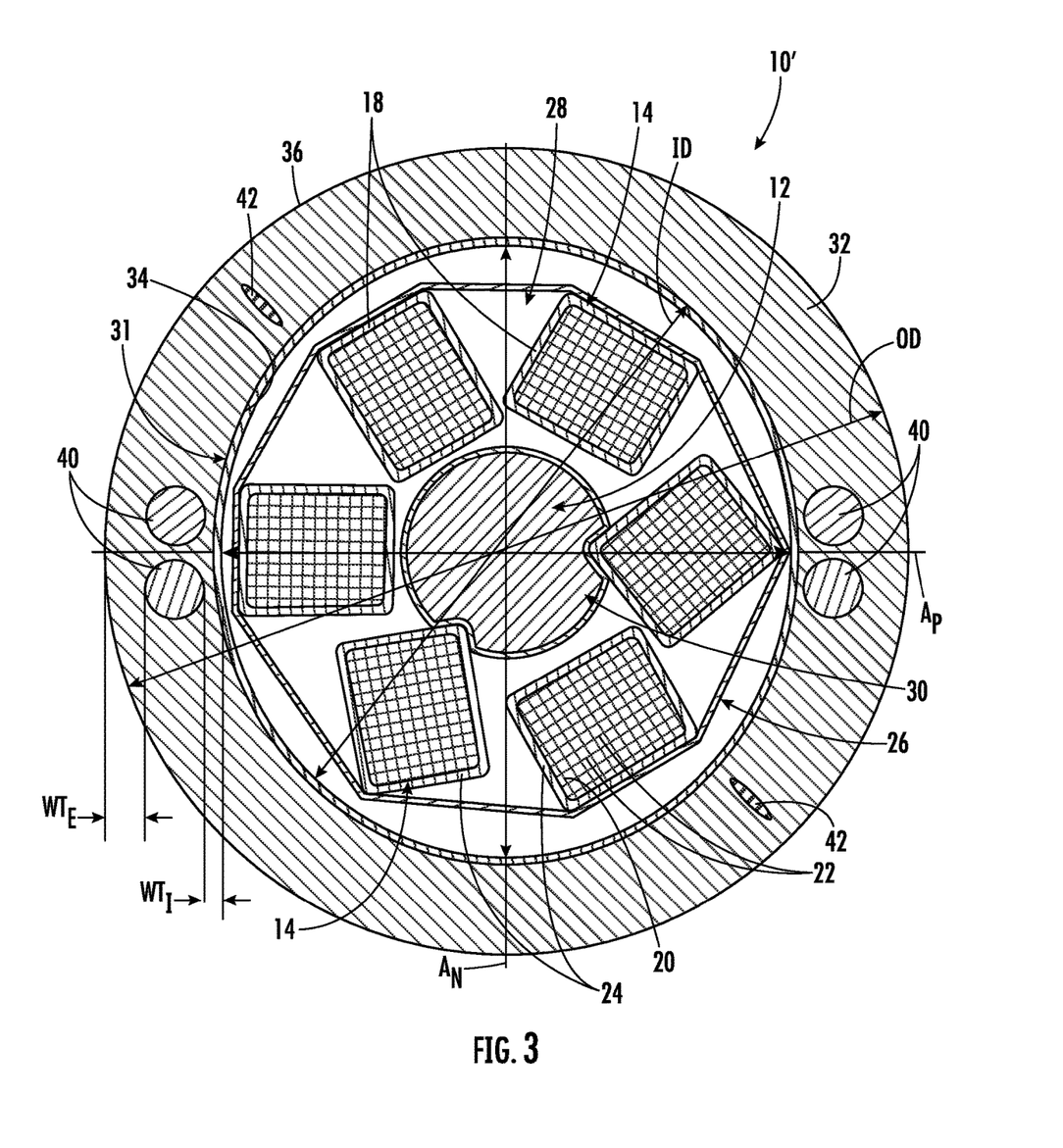
FIG. 3 depicts another embodiment of an optical fiber cable having an alternate strength element configuration, according to aspects of the present disclosure.

In accordance with other aspects of the present disclosure, and as shown in FIG. 3, an alternative to the construction shown in FIG. 1 spaces the strength elements 40 on each side apart by twice the interior thickness $WT_1$ between the strength elements 40 and the interior surface 34 of the sheath 32. Spacing the strength elements 40 on each side in this manner permits the interior thickness to be ½ of that shown in FIG. 2. In this case, spacing the strength elements 40, for example, by 0.4 mm allows for a reduced $WT_1$ of 0.2 mm while maintaining an installation twist rate of the cable of 500 mm/full twist. With all other features remaining the same, including the same interior dimensions to achieve free space, the outside diameter of the cable 10' shown in FIG. 3 may have a slightly smaller OD.

Figure 4:
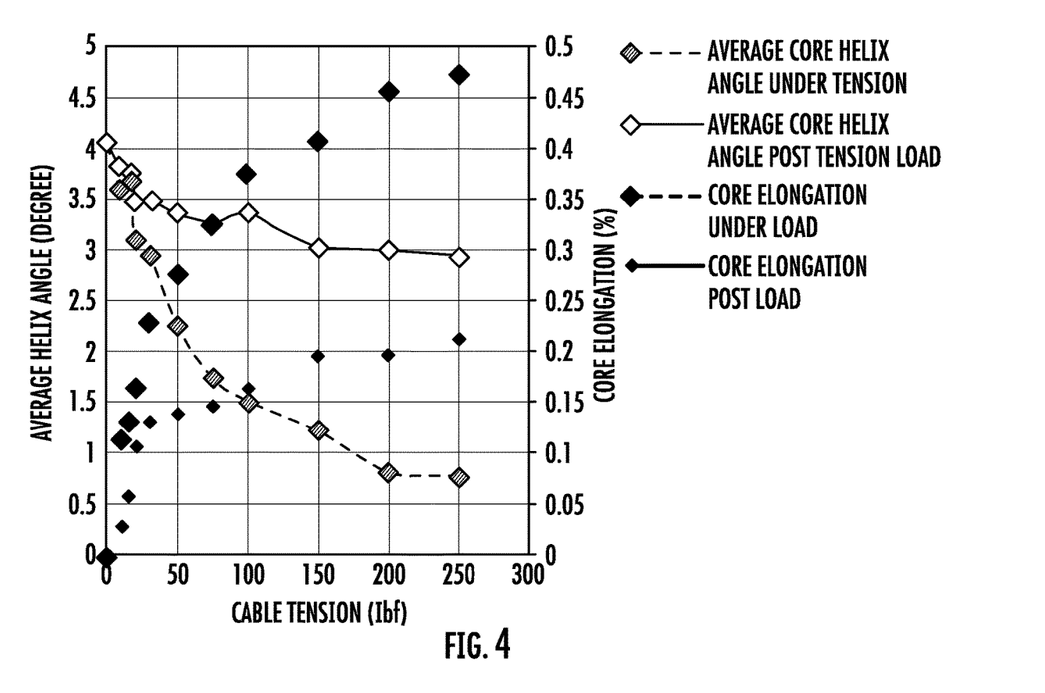
FIG. 4 is a chart illustrating core elongation and torsion in the core of the cable shown in FIG. 1 as a response to applied tension, according to aspects of the present disclosure.

Optical fiber cables are designed to an installation tension load. The core of a cable elongates the same as the cable itself. The tension reflected in the core is a function of the ECL of the core and the EA of the core itself. Tensioning the core independently of the cable sheath permits characterization of the core behavior as a function of tension. In the stranded configuration of the cable 10 shown in FIG. 1, for example, the core 28 unwinds as the core 28 elongates under tension. The core elongation and torsion in the core 28 as a response to applied tension is shown in FIG. 4, which records the elastic behavior of the core after each progressive load level.

When cable 10 is under tension in a bend, once the ECL and radial clearance between the core 28 and sheath 32 are consumed, the core 28 then contributes to the total tensile EA of the cable. The tension in the core 28 in a bend results in pressure on the core 28 that is a function of T/R. The radial load that is experienced by the core in a bend is ultimately transferred as a pressure.

Figure 5:
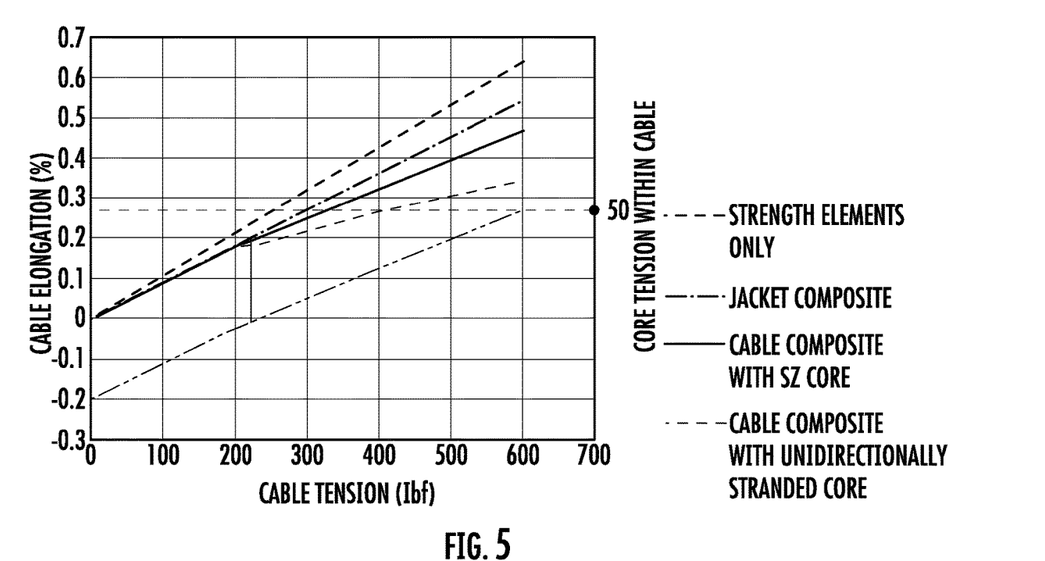
FIG. 5 is a chart showing the behavior of cable sections in tension when comparing a cable having unidirectionally stranded subunits versus a cable having SZ stranded subunits.

FIG. 5 shows the behavior of cable sections in tension. It also shows the behavior of the elongation of the components from an additive perspective. Under load at 600 lbf, four 1.6 mm diameter strength elements 40 would elongate 0.64%. Adding an MDPE sheath 32 of 160 mm$^2$ to these elements reduces the elongation to 0.54%. Adding a unidirectionally stranded core 28 of 864 fibers with 0.2% ECL reduces the elongation to 0.34%. Adding the SZ stranded core 28 constructed as above with an ECL of 0.2% results in a cable elongation of 0.47%. The two cores construction just mentioned have the same number of fibers and ECL. The difference in 0.34% and 0.47% is due the difference in effective EA of the core construction. The SZ core is less and has been designed to be less.

In a cable that has been constructed with 0.2% ECL, 4, 01.6 mm GRP elements, 160 mm$^2$ of MDPE sheath, and a core as described above, the cable will elongate 0.48% at a tension of 600 lbf. The core will elongate 0.27%. That elongation occurs at tension of 50 lbf. By comparison a unidirectionally stranded core with all other cable components being the same less the thin film with have a tension of 250 lbf. The T/R is therefore 5X higher. This load is acceptable for a helically stranded core as it retains its helix angle under load and its units can slide from the compression in the bend to the tension side of the bend. An SZ core largely limits the motion of the units requiring that the T/R be reduced. In accordance with aspects of this disclosure, a method of manufacture realizes a cable design having planar ribbon subunits of 144 fibers each in an SZ configuration.

In traditional loose tube stranding, the stranding of buffer tubes permits the free space within the buffer tubes to become a strain window for the fibers. This mechanism works by allowing the fibers or ribbons to move toward the center of the cable without resistance as the cable is strained during installation loads. The radial movement of the fibers/ribbons reduces their strain at cable installation cable loads. That free space is not available in the subunits 14 of the cables in accordance with this disclosure. In addition to ECL, a supplemental strain window for the core 28 is accomplished by a low tensile stiffness central element 12 made of a polyolefin foam, a low stiffness binder film 26 made of LLDPE, and by minimizing the number of turns between reversals while still retaining enough average lay length, i.e. helix angle, for the core 28 to function as a stranded unit in bending. The combined low tensile stiffness of the central element 12 and film binder 26 and reversing stranding direction of the individual ribbon stacks 18 in the subunits 14 of the SZ stranded core 28, permit the core to unwind under relatively low tensions. In essence, the helix factor of the units within the core is converted to axial length or "strain" window. The significance of ECL and low torsional stiffness of the core is that a core within this cable construction with 0.2% ECL tensioned to the standard 2700 N (600 lbf) installation load will only develop a core tension of 222 N (50 lbf). Maintaining a low core tension ensures that the optical fiber bend radius developed when the cable goes around a specified minimum bend radius under installation load remains below 60% of proof stress. In cables with unidirectional stranding, it has been demonstrated that core loads with cable in a bend where the bend diameter is at 20× the cable diameter up to 1355 N (300 lbf) are acceptable.

Unwinding of the core 28 also affects the lay length of each subunit by lengthening or tightening the lay length of each subunit depending upon the relative direction of the core and the stranded direction of each subunit. However, because the core is SZ stranded, when the core is placed in tension, the subunits are both wound and unwound, depending upon their location in the S or Z portion of the core and their individual hand direction, summing to a net zero change in unit lay. Twisting a core that has been unidirectionally stranded inherently either tightens the individual units or lengthens their lay length. Through experimental testing is has been determined that a 300 mm subunit lay length is best for installation tension around a bend diameter equal to 20× the cable OD.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   a central element extending along a longitudinal axis of the optical fiber cable;
   a plurality of routable subunits, each routable subunit comprising a rigidly stranded ribbon stack and a tight buffer layer surrounding the ribbon stack, wherein the subunits are SZ-stranded around the central element to form a cable core;
   a binder film that continuously and contiguously surrounds the plurality of routable subunits along the longitudinal axis;
   a cable sheath that continuously and contiguously surrounds the binder film along the longitudinal axis, wherein the cable sheath comprises an inside surface and an outside surface, the inside surface defining an elliptical shape and the outside surface defining a generally circular shape; and
   a plurality of strength elements embedded in the cable sheath, wherein the plurality of strength elements comprises four strength elements arranged in diametrically opposed pairs, which creates a preferred bend axis $A_P$, and wherein the strength elements in each pair are tangential to one another and are embedded between the interior surface and the exterior surface of the cable sheath such that an interior wall thickness of the cable sheath at the location of the strength elements is approximately 0.4 mm between the strength elements and the interior surface and an exterior wall thickness is approximately 1.0 mm thick between the strength elements and the exterior surface of the cable sheath.

2. The optical fiber cable of claim 1, wherein the binder film is formed from at least one of linear low-density polyethylene, a polyester, a polyamide, or a polypropylene copolymer.

3. The optical fiber cable of claim 2, wherein the binder film comprises linear low-density polyethylene, has a thickness of from 0.02 mm to 0.15 mm, and forms a continuous tensioned shell in all directions that applies a distributed radial force to the subunits as the linear low-density polyethylene cools below its vicat softening temperature.

4. The optical fiber cable of claim 1, wherein the central element is a cylindrical element that extends along the longitudinal axis and is comprised of a low-density polyethylene foam material.

5. The optical fiber cable of claim 4, further comprising a water blocking tape surrounding the central element along the longitudinal axis.

6. The optical fiber cable of claim 1, wherein the plurality of subunits comprises at least 864 optical fibers, and wherein the outer surface of the cable sheath has an average outer diameter of less than 23 millimeters.

7. The optical fiber cable of claim 1, wherein each ribbon stack of the plurality of routable subunits has a rectangular cross-section.

8. The optical fiber cable of claim 1, further comprising a core barrier layer surrounding the cable core between the binder film and the cable sheath.

9. The optical fiber cable of claim 8, wherein the core barrier layer is a water swellable tape constructed with a polyester carrier.

10. The optical fiber cable of claim 1, wherein the strength elements are glass reinforced plastic rods having a diameter of 1.6 mm.

11. The optical fiber cable of claim 1, wherein the strength elements in each pair are spaced apart from one another and are embedded between the interior surface and the exterior surface of the cable sheath such that a space between the strength elements in each pair is approximately twice an interior wall thickness of the cable sheath between the strength elements and the interior surface of the cable sheath.

12. The optical fiber cable of claim 1, wherein the cable core has an excess core length of 0.2%.

13. The optical fiber cable of claim 1, wherein the elliptical shape of the interior surface cross section is defined by a first inside diameter of approximately 16.2 mm when measured across the preferred bending axis $A_P$ and a second inside diameter of approximately 17.2 mm when measured across a nonpreferred bending axis $A_N$.

14. The optical fiber cable of claim 1, wherein a subunit lay length for each one of the stranded subunits is about 300 mm to accommodate installation tension around a bend diameter equal to 20 times of an outside diameter of the cable sheath.

15. The optical fiber cable of claim 1, wherein the ribbon stack in every other subunit is rigidly stranding in an opposing strand direction from the previous or adjacent subunit.

16. The optical fiber cable of claim 1, wherein the cable sheath comprises medium density polyethylene.

17. The optical fiber cable of claim 1, wherein the subunits are SZ stranded to have a reverse oscillation lay every 720°.

* * * * *